A. S. FRASER.
TRACTION WHEEL.
APPLICATION FILED DEC. 24, 1915.
1,190,536.
Patented July 11, 1916.
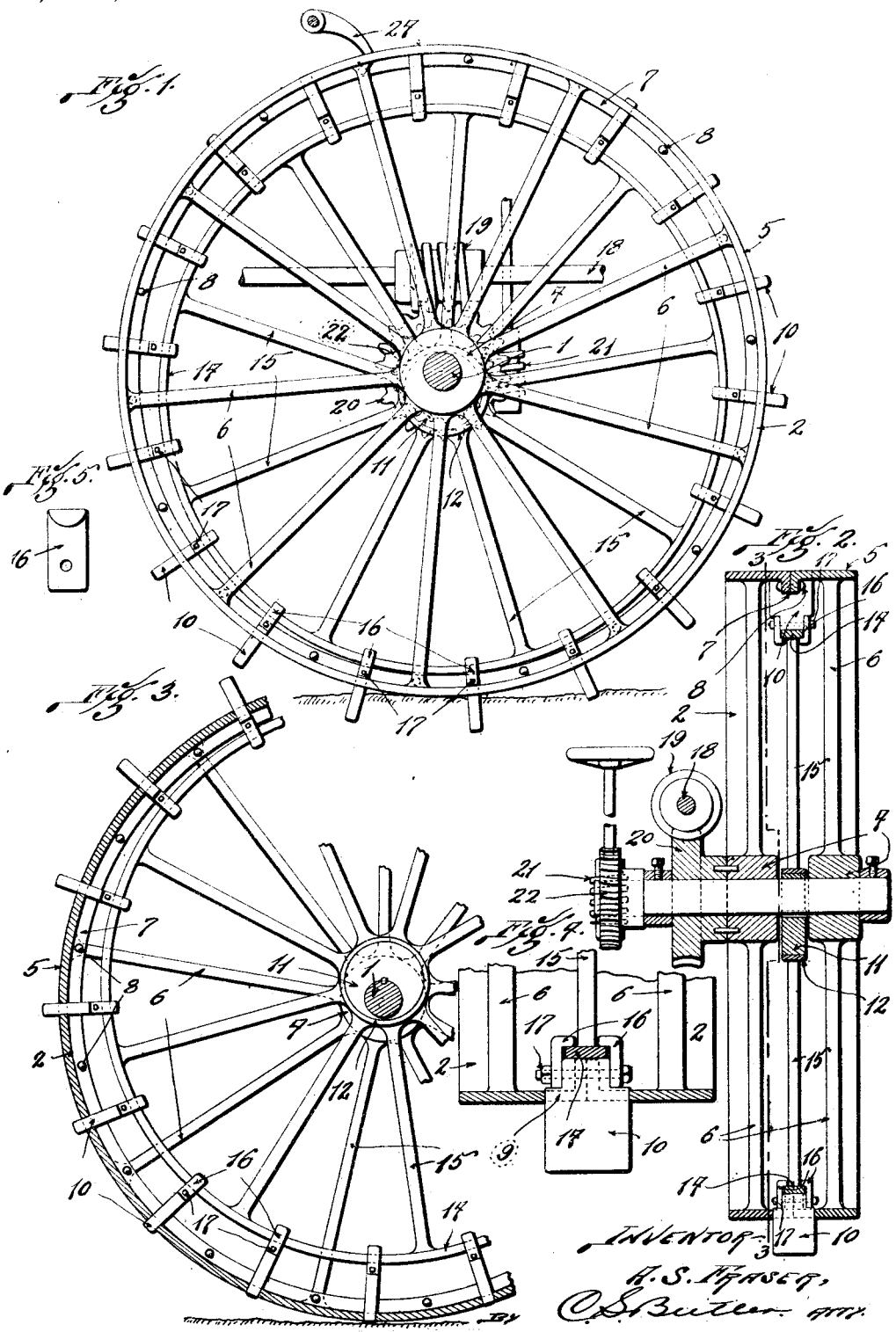

UNITED STATES PATENT OFFICE.

ALEXANDER S. FRASER, OF CAIRO, ILLINOIS.

TRACTION-WHEEL.

1,190,536.  Specification of Letters Patent.  Patented July 11, 1916.

Application filed December 24, 1915. Serial No. 68,473.

*To all whom it may concern:*

Be it known that I, ALEXANDER S. FRASER, a citizen of the United States, residing at the city of Cairo, State of Illinois, have invented a certain new and useful Improvement in Traction-Wheels, of which the following is a full, clear, and exact description, such as will enable others skilled in the art to which it appertains to make and use the same, reference being had to the accompanying drawings, forming part of this application.

This invention relates broadly to tractors, or self-propelled power vehicles, and pertains specifically to vehicles of this nature designed particularly for farm work.

More specifically the invention pertains to certain improvements in a driving wheel for tractors.

It is the principal object of my invention to provide a form of traction wheel which can be employed effectively on light tractors and permit their being used efficiently in tractive farm work, such as plowing, raking, and pulling loads.

In tractors now employed in farm work, the tractive power is largely dependent upon the weight of the machine, which is depended upon to give the requisite amount of adhesion. Of course, the tires of the road wheels are commonly provided with various irregularities to increase the adhesion, but the tractive efficiency of the machine is more particularly dependent upon its weight. Heavy tractors are undesirable in farm work for many reasons, both because of the large amount of power required to move the device itself, and on account of the effect of the heavy machine on the soil over which it is run.

It is the purpose of my present invention to increase the tractive efficiency of light tractors by providing a form of road or driving wheel which will greatly increase the tractive adhesion without requiring a commensurate increase in power. To this purpose I provide the driving wheel with extensible and retractile earth engaging members and an improved arrangement for operating them. I am aware that the provision of extensible and retractile earth engaging members is not in itself novel in traction wheels, as I know of various forms thereof and various arrangements for actuating them. In the operation of such of these former devices as I have observed, however, the earth engaging members have been subject to binding in their mountings due to deflection of the operating members out of the line of thrust. By the improved construction herein claimed, I not only obviate this difficulty, but provide a wheel of great strength, light weight, and simple operation.

In the accompanying drawings wherein one embodiment of my invention is illustrated—Figure 1 represents a side view of my improved traction wheel; Fig. 2 a transverse section on a diameter thereof; Fig. 3 a longitudinal section substantially on line 3—3 of Fig. 2; Fig. 4 a detail illustrating an earth engaging member; Fig. 5 a detail illustrating one of the hangers for the earth engaging members.

By reference to the drawings in detail, it will be understood that 1 represents an axle which is normally stationary, being suitably mounted on the frame of the machine. Upon this axle are journaled the similar wheel portions 2 each having a hub portion 4 and a rim or tread 5 supported from the hub by spokes 6. The rims have in-turned marginal flanges which are abutted and connected by bolts or rivets 8. At intervals about its periphery, the rim portion is provided with tranverse slots 9 cut through both the tread and the conjoined flanges 7 and terminating between the spokes 6 of the wheel portions. Operably mounted in each of these slots is an earth engaging member 10 in the nature of a relatively thin and wide plate, the opposite sides of which are engaged by the walls of the slot 9. The mounting is such that these earth engaging members may be moved outwardly and inwardly on radii of the wheel. Keyed on the axle 1 intermediate the hub portions 4, is an eccentric 11, and mounted on this eccentric is a thrust wheel comprising the hub portion 12, rim 14, and connecting spokes 15. The mounting of this thrust wheel is such that it is revoluble on the eccentric 11 intermediate the spokes 6 and hubs 4, and consequently, the thrust wheel will bear an eccentric relationship to the wheel portions 2. The relative diameters of the drive wheel, the thrust wheel and the eccentric are such that on the radius of greatest thrust of the eccentric, the perimeter of the thrust wheel will rest upon the flanges 7. The earth engaging members 10 are operably engaged with the rim of the thrust wheel by means of hangers 16. Each of these hangers is in the form of an angle member, one arm of which is adapted to be secured to one side of an earth engaging member, as by means of the bolt 17, and the other arm of which is spaced apart from the inner edge of the earth engaging member and extends inwardly thereof to freely engage the inner face of the rim 14 of the thrust wheel. The inner edge of the earth engaging member is thereby held in movable engagement with the outer face of the rim 14 of the thrust wheel. The engagement between the thrust wheel and the earth engaging members as thus supported thereon is such as to permit rotative movement of the thrust wheel relative to the earth engaging members. To facilitate this, the inner edges of the transverse flange of the hangers may be beveled or rounded off as illustrated in Fig. 5.

Suitable transmission means is provided for driving the wheel, that illustrated being in the form of a transmission shaft 18 carrying a worm 19 which coöperates with a worm pinion 20 suitably secured to the adjacent hub 4. Upon rotation of the wheel, the thrust wheel, under control of the eccentric 11, which is stationary, and due to its engagement with the earth engaging members 10, will cause the latter to be projected and retracted through the slots 9 to an extent equal to the thrust of the eccentric. As the earth engaging members will be projected to the maximum extent on the radius of the maximum thrust of the eccentric, the point at which they will be at maximum projected or retracted position may be determined by the position of the eccentric. Of course, when in tractive use, such as plowing, the eccentric will be placed in the position illustrated in Fig. 1, wherein the earth engaging members are projected as they reach the ground, so that they may engage the soil and thereby increase the tractive adhesion. When it is desired to run the machine over hard pavement or smooth ground and no great tractive power is required, the eccentric may be adjusted to the position illustrated in Fig. 3 by adjustably rotating the axle 1, which may be accomplished by any suitable mechanism such as the worm 21 and worm pinion 22. With the eccentric in this position, the earth engaging members will be in their innermost position as they reach the ground, leaving the tread of the wheel smooth. In order to clear the wheel of any earth adhering to the tread, a scraper 24 may be provided to coöperate with the tread, said scraper being movable away from the tread to permit passage of the earth engaging members when the adjustment of the eccentric is such that they are projected at that point.

By virtue of the construction constituting my invention, it will be observed that the actuating member through which the thrust is transmitted from the eccentric to the earth engaging members is absolutely free for rotating movement relative to both the eccentric and the earth engaging members. Furthermore, the thrust transmitting member engages the earth engaging members so close to the rim or tread of the wheel that there is but short leverage between the rim of the thrust wheel and the bearing point of the earth engaging member upon the rim of the drive wheel. Consequently, by my construction, I avoid any binding effect between the earth engaging members and the walls of the slots in which they operate, due to relative deflection of the earth engaging members and their actuating portions out of the line of thrust. Furthermore, the construction provides a wheel very strong for its weight, the thrust wheel, due to its contact with the flanges 7, operating to carry some of the load as well as actuate the earth engaging members. Furthermore, a wheel of my improved construction may be readily repaired, as it is a comparatively simple matter to remove and replace the earth engaging elements when they become worn, by simply removing bolts 17.

I am aware that various changes and modifications not herein illustrated and described may be made in the device without departing from the scope of my invention which is indicated in the following claims.

What I claim is:

1. A traction wheel including a rotatable drive wheel, a guiding member disposed eccentrically of the axis of said wheel and normally held against rotation therewith, radially movable earth engaging elements disposed peripherally of the wheel, and a freely movable thrust member operably associated with the eccentric guiding member and earth engaging elements for projecting and retracting the latter.

2. A traction wheel including a rotatable drive wheel, an axle on which the wheel rotates, a guiding member disposed eccentrically on the axle, means for adjusting said guiding member to different positions, earth engaging elements mounted on the wheel and movable beyond the tread thereof, and a thrust member operably connecting the guiding member and the earth engaging elements, which thrust member is rotatable relative to the wheel.

3. A traction wheel including a rotatable drive wheel, an extensible and retractile earth engaging member disposed peripherally thereof, guiding means normally held against rotation with the wheel, and a thrust member coöperating with said guiding means and earth engaging member to project and retract the latter, said thrust member being arranged for revoluble movement relative to both the guiding means and the earth engaging member.

4. A traction wheel including a rotatable drive wheel, an eccentric associated therewith and normally held against rotation, a thrust wheel mounted on said eccentric for rotation relative to the drive wheel, and extensible earth engaging members disposed peripherally of the drive wheel and movably engaging the thrust wheel at intervals about its circumference.

5. A traction wheel including a drive wheel, extensible earth engaging members disposed peripherally thereof, a thrust wheel rotatable relative to the drive wheel and having peripheral engagement with the earth engaging members for projecting and retracting them, and means for guiding said thrust wheel for rotation eccentrically of the drive wheel.

6. A traction wheel including a drive wheel, movable earth engaging members peripherally disposed thereon, a thrust wheel disposed within the circumference of the drive wheel and journaled eccentrically thereof so as to tangentially engage the rim thereof, said thrust wheel being operably associated with the earth engaging members and revoluble relative to the drive wheel, and means for axially supporting the drive wheel and the thrust wheel.

7. A traction wheel including a rotatable drive wheel having a slotted rim, earth engaging elements movably mounted in the slots of the rim, a thrust member revoluble relative to the drive wheel and having operable association with the different earth engaging elements at intervals about its circumference adjacent the rim of the drive wheel, and means for guiding said thrust member eccentrically of the drive wheel.

8. In a traction wheel, the combination of an earth engaging rim, said rim being provided with peripheral apertures, earth engaging elements supported on the rim and extensible through said apertures, a thrust member mounted for rotation with the rim and relative to said earth engaging elements, and removable members forming a loose connection between said earth engaging members and said thrust member for the purpose described.

In testimony whereof I hereunto affix my signature in the presence of two witnesses, this 11th day of December, 1915.

ALEXANDER S. FRASER.

Witnesses:
 EVA C. RICHMOND,
 NETTIE V. HIRES.